United States Patent
Steiman et al.

(10) Patent No.: US 11,625,366 B1
(45) Date of Patent: Apr. 11, 2023

(54) SYSTEM, METHOD, AND COMPUTER PROGRAM FOR AUTOMATIC PARSER CREATION

(71) Applicant: Exabeam, Inc., Foster City, CA (US)

(72) Inventors: Barry Steiman, San Ramon, CA (US); Sylvain Gil, San Francisco, CA (US); Domingo Mihovilovic, Menlo Park, CA (US)

(73) Assignee: Exabeam, Inc., Foster City, CA (US)

( * ) Notice: Subject to any disclaimer, the term of this patent is extended or adjusted under 35 U.S.C. 154(b) by 70 days.

(21) Appl. No.: 16/890,557

(22) Filed: Jun. 2, 2020

Related U.S. Application Data

(60) Provisional application No. 62/856,903, filed on Jun. 4, 2019.

(51) Int. Cl.
| | |
|---|---|
| *G06F 16/21* | (2019.01) |
| *H04L 9/40* | (2022.01) |
| *G06F 11/34* | (2006.01) |
| *G06N 5/022* | (2023.01) |
| *G06F 21/55* | (2013.01) |
| *G06F 11/36* | (2006.01) |
| *G06F 21/57* | (2013.01) |

(52) U.S. Cl.
CPC ........ *G06F 16/211* (2019.01); *G06F 11/3476* (2013.01); *G06F 11/3692* (2013.01); *G06F 21/554* (2013.01); *G06F 21/577* (2013.01); *G06N 5/022* (2013.01); *H04L 63/1416* (2013.01); *H04L 63/1433* (2013.01)

(58) Field of Classification Search
CPC .................................................. G06F 16/211
See application file for complete search history.

(56) References Cited

U.S. PATENT DOCUMENTS

| | | |
|---|---|---|
| 5,941,947 A | 8/1999 | Brown et al. |
| 6,223,985 B1 | 5/2001 | DeLude |
| 6,594,481 B1 | 7/2003 | Johnson et al. |

(Continued)

OTHER PUBLICATIONS

Bahnsen, Alejandro Correa "Classifying Phishing URLs Using Recurrent Neural Networks", IEEE 2017.

(Continued)

*Primary Examiner* — Brittany N Allen
(74) *Attorney, Agent, or Firm* — Lessani Law Group, PC

(57) ABSTRACT

The present disclosure describes a system, method, and computer program for automatically creating a parser for a log group. A parser-creation system groups logs that do not satisfy conditions for an existing parser, enables a user to select a log group for parser creation, and automatically creates a parser for the selected log group. In creating a parser, the system extracts values and keys value pairs from the log group and identifies the corresponding normalized output fields and regular expressions for the values and key-value pairs. To identify normalized fields corresponding to values and key-value pairs, the system compares the values and key-value pairs to one or more knowledgebases that include: (1) regular expressions from existing parsers, (2) regular expressions for value types associated with normalized fields, and (3) a list of keys in key-value pairs associated with normalized fields. As the system learns new token-to-normalized fields relationships, the system adds the relationships to its knowledgebase.

9 Claims, 11 Drawing Sheets

(56) References Cited

U.S. PATENT DOCUMENTS

| | | |
|---|---|---|
| 7,181,768 B1 | 2/2007 | Ghosh et al. |
| 7,624,277 B1 | 11/2009 | Simard et al. |
| 7,668,776 B1 | 2/2010 | Ahles |
| 8,326,788 B2 | 12/2012 | Allen et al. |
| 8,443,443 B2 | 5/2013 | Nordstrom et al. |
| 8,479,302 B1 | 7/2013 | Lin |
| 8,484,230 B2* | 7/2013 | Harnett ................. G06F 16/332 707/755 |
| 8,539,088 B2 | 9/2013 | Zheng |
| 8,583,781 B2 | 11/2013 | Raleigh |
| 8,606,913 B2 | 12/2013 | Lin |
| 8,676,273 B1 | 3/2014 | Fujisake |
| 8,850,570 B1 | 9/2014 | Ramzan |
| 8,881,289 B2 | 11/2014 | Basavapatna et al. |
| 9,055,093 B2 | 6/2015 | Borders |
| 9,081,958 B2 | 7/2015 | Ramzan et al. |
| 9,185,095 B1 | 11/2015 | Moritz et al. |
| 9,189,623 B1 | 11/2015 | Lin et al. |
| 9,202,052 B1 | 12/2015 | Fang et al. |
| 9,680,938 B1 | 6/2017 | Gil et al. |
| 9,690,938 B1 | 6/2017 | Saxe et al. |
| 9,692,765 B2 | 6/2017 | Choi et al. |
| 9,760,240 B2 | 9/2017 | Maheshwari et al. |
| 9,779,253 B2 | 10/2017 | Mahaffey et al. |
| 9,798,883 B1 | 10/2017 | Gil et al. |
| 9,843,596 B1 | 12/2017 | Averbuch et al. |
| 9,898,604 B2 | 2/2018 | Fang et al. |
| 10,063,582 B1 | 8/2018 | Feng et al. |
| 10,095,871 B2 | 10/2018 | Gil et al. |
| 10,178,108 B1 | 1/2019 | Lin et al. |
| 10,354,015 B2 | 7/2019 | Kalchbrenner et al. |
| 10,397,272 B1 | 8/2019 | Bruss et al. |
| 10,419,470 B1 | 9/2019 | Segev et al. |
| 10,445,311 B1* | 10/2019 | Saurabh ............. G06F 16/2365 |
| 10,467,631 B2 | 11/2019 | Dhurandhar et al. |
| 10,474,828 B2 | 11/2019 | Gil et al. |
| 10,496,815 B1 | 12/2019 | Steiman et al. |
| 10,621,343 B1 | 4/2020 | Maciejak et al. |
| 10,645,109 B1 | 5/2020 | Lin et al. |
| 10,685,293 B1 | 6/2020 | Heimann et al. |
| 10,803,183 B2 | 10/2020 | Gil et al. |
| 10,819,724 B2 | 10/2020 | Amiri et al. |
| 10,841,338 B1 | 11/2020 | Lin et al. |
| 10,887,325 B1 | 1/2021 | Lin et al. |
| 10,944,777 B2 | 3/2021 | Lin et al. |
| 11,017,173 B1 | 5/2021 | Lu et al. |
| 11,080,483 B1 | 8/2021 | Islam et al. |
| 11,080,591 B2 | 8/2021 | van den Oord et al. |
| 11,140,167 B1 | 10/2021 | Lin et al. |
| 11,178,168 B1 | 11/2021 | Lin et al. |
| 11,245,716 B2 | 2/2022 | Roelofs et al. |
| 2002/0107926 A1 | 8/2002 | Lee |
| 2003/0147512 A1 | 8/2003 | Abburi |
| 2004/0073569 A1 | 4/2004 | Knott et al. |
| 2006/0090198 A1 | 4/2006 | Aaron |
| 2007/0156771 A1 | 7/2007 | Hurley et al. |
| 2007/0282778 A1 | 12/2007 | Chan et al. |
| 2008/0028467 A1 | 1/2008 | Kommareddy et al. |
| 2008/0040802 A1 | 2/2008 | Pierson et al. |
| 2008/0170690 A1 | 7/2008 | Tysowski |
| 2008/0262990 A1 | 10/2008 | Kapoor et al. |
| 2008/0301780 A1 | 12/2008 | Ellison et al. |
| 2009/0144095 A1 | 6/2009 | Shahi et al. |
| 2009/0171752 A1 | 7/2009 | Galvin et al. |
| 2009/0293121 A1 | 11/2009 | Bigus et al. |
| 2010/0125911 A1 | 5/2010 | Bhaskaran |
| 2010/0191763 A1* | 7/2010 | Wu ........................ G06N 5/022 707/769 |
| 2010/0269175 A1 | 10/2010 | Stolfo et al. |
| 2010/0284282 A1 | 11/2010 | Golic |
| 2011/0167495 A1 | 7/2011 | Antonakakis et al. |
| 2012/0278021 A1 | 11/2012 | Lin et al. |
| 2012/0316835 A1 | 12/2012 | Maeda et al. |
| 2012/0316981 A1 | 12/2012 | Hoover et al. |
| 2013/0080631 A1 | 3/2013 | Lin |
| 2013/0117554 A1 | 5/2013 | Ylonen |
| 2013/0197998 A1 | 8/2013 | Buhrmann et al. |
| 2013/0227643 A1 | 8/2013 | Mccoog et al. |
| 2013/0268260 A1* | 10/2013 | Lundberg ............ G06F 11/3664 704/8 |
| 2013/0305357 A1 | 11/2013 | Ayyagari et al. |
| 2013/0340028 A1 | 12/2013 | Rajagopal et al. |
| 2014/0007238 A1 | 1/2014 | Magee |
| 2014/0090058 A1 | 3/2014 | Ward et al. |
| 2014/0101759 A1 | 4/2014 | Antonakakis et al. |
| 2014/0315519 A1 | 10/2014 | Nielsen |
| 2015/0026027 A1 | 1/2015 | Priess et al. |
| 2015/0039543 A1 | 2/2015 | Athmanathan et al. |
| 2015/0046969 A1 | 2/2015 | Abuelsaad et al. |
| 2015/0121503 A1 | 4/2015 | Xiong |
| 2015/0205944 A1 | 7/2015 | Turgeman |
| 2015/0215325 A1 | 7/2015 | Ogawa |
| 2015/0339477 A1 | 11/2015 | Abrams et al. |
| 2015/0341379 A1 | 11/2015 | Lefebvre et al. |
| 2015/0363691 A1 | 12/2015 | Gocek et al. |
| 2016/0005044 A1 | 1/2016 | Moss et al. |
| 2016/0021117 A1 | 1/2016 | Harmon et al. |
| 2016/0063397 A1 | 3/2016 | Ylipaavalniemi et al. |
| 2016/0292592 A1* | 10/2016 | Patthak ............. G06F 16/2455 |
| 2016/0306965 A1 | 10/2016 | Iyer et al. |
| 2016/0364427 A1 | 12/2016 | Wedgeworth, III |
| 2017/0019506 A1 | 1/2017 | Lee et al. |
| 2017/0024135 A1 | 1/2017 | Christodorescu et al. |
| 2017/0127016 A1 | 5/2017 | Yu et al. |
| 2017/0155652 A1 | 6/2017 | Most et al. |
| 2017/0161451 A1 | 6/2017 | Weinstein et al. |
| 2017/0178026 A1* | 6/2017 | Thomas ................. G06N 20/00 |
| 2017/0213025 A1 | 7/2017 | Srivastav et al. |
| 2017/0236081 A1 | 8/2017 | Grady Smith et al. |
| 2017/0264679 A1 | 9/2017 | Chen et al. |
| 2017/0318034 A1 | 11/2017 | Holland et al. |
| 2017/0323636 A1 | 11/2017 | Xiao et al. |
| 2018/0004961 A1 | 1/2018 | Gil et al. |
| 2018/0048530 A1 | 2/2018 | Nikitaki et al. |
| 2018/0063168 A1 | 3/2018 | Sofka |
| 2018/0069893 A1 | 3/2018 | Amit et al. |
| 2018/0075343 A1 | 3/2018 | van den Oord et al. |
| 2018/0089304 A1* | 3/2018 | Vizer .................... G06F 16/287 |
| 2018/0097822 A1 | 4/2018 | Huang et al. |
| 2018/0144139 A1 | 5/2018 | Cheng et al. |
| 2018/0157963 A1 | 6/2018 | Salti et al. |
| 2018/0165554 A1 | 6/2018 | Zhang et al. |
| 2018/0190280 A1 | 7/2018 | Cui et al. |
| 2018/0234443 A1 | 8/2018 | Wolkov et al. |
| 2018/0248895 A1 | 8/2018 | Watson et al. |
| 2018/0285340 A1 | 10/2018 | Murphy et al. |
| 2018/0288063 A1 | 10/2018 | Koottayi et al. |
| 2018/0288086 A1 | 10/2018 | Amiri et al. |
| 2018/0307994 A1 | 10/2018 | Cheng et al. |
| 2018/0322368 A1 | 11/2018 | Zhang et al. |
| 2019/0014149 A1 | 1/2019 | Cleveland et al. |
| 2019/0028496 A1 | 1/2019 | Fenoglio et al. |
| 2019/0034641 A1 | 1/2019 | Gil et al. |
| 2019/0066185 A1 | 2/2019 | More et al. |
| 2019/0080225 A1 | 3/2019 | Agarwal |
| 2019/0089721 A1 | 3/2019 | Pereira et al. |
| 2019/0103091 A1 | 4/2019 | Chen |
| 2019/0114419 A1 | 4/2019 | Chistyakov et al. |
| 2019/0124045 A1 | 4/2019 | Zong et al. |
| 2019/0132629 A1 | 5/2019 | Kendrick |
| 2019/0149565 A1 | 5/2019 | Hagi et al. |
| 2019/0182280 A1 | 6/2019 | La Marca et al. |
| 2019/0205750 A1 | 7/2019 | Zheng et al. |
| 2019/0213247 A1 | 7/2019 | Pala et al. |
| 2019/0244603 A1 | 8/2019 | Angkititrakul et al. |
| 2019/0303703 A1 | 10/2019 | Kumar et al. |
| 2019/0318100 A1 | 10/2019 | Bhatia et al. |
| 2019/0334784 A1 | 10/2019 | Kvernvik et al. |
| 2019/0349400 A1 | 11/2019 | Bruss et al. |
| 2019/0378051 A1 | 12/2019 | Widmann et al. |
| 2020/0021607 A1 | 1/2020 | Muddu et al. |
| 2020/0021620 A1 | 1/2020 | Purathepparambil et al. |
| 2020/0082098 A1 | 3/2020 | Gil et al. |
| 2020/0228557 A1 | 7/2020 | Lin et al. |

(56) References Cited

U.S. PATENT DOCUMENTS

| | | |
|---|---|---|
| 2020/0302118 A1 | 9/2020 | Cheng et al. |
| 2020/0327886 A1 | 10/2020 | Shalaby et al. |
| 2021/0089884 A1 | 3/2021 | Macready et al. |
| 2021/0125050 A1 | 4/2021 | Wang |
| 2021/0182612 A1 | 6/2021 | Zeng et al. |
| 2021/0232768 A1 | 7/2021 | Ling et al. |
| 2022/0006814 A1 | 1/2022 | Lin et al. |

OTHER PUBLICATIONS

Chen, Jinghui, et al., "Outlier Detection with Autoencoder Ensembles", Proceedings of the 2017 SIAM International Conference on Data Mining, pp. 90-98.

Cooley, R., et al., "Web Mining: Information and Pattern Discovery on the World Wide Web", Proceedings Ninth IEEE International Conference on Tools with Artificial Intelligence, Nov. 3-8, 1997, pp. 558-567.

DatumBox Blog, "Machine Learning Tutorial: The Naïve Bayes Text Classifier", DatumBox Machine Learning Blog and Software Development News, Jan. 2014, pp. 1-11.

Freeman, David, et al., "Who are you? A Statistical Approach to Measuring User Authenticity", NDSS, Feb. 2016, pp. 1-15.

Goh, Jonathan et al., "Anomaly Detection in Cyber Physical Systems using Recurrent Neural Networks", IEEE 2017.

Ioannidis, Yannis, "The History of Histograms (abridged)", Proceedings of the 29th VLDB Conference (2003), pp. 1-12.

Kim, Jihyun et al., "Long Short Term Memory Recurrent Neural Network Classifier for Intrusion Detection", IEEE 2016.

Malik, Hassan, et al., "Automatic Training Data Cleaning for Text Classification", 11th IEEE International Conference on Data Mining Workshops, 2011, pp. 442-449.

Poh, Norman, et al., "EER of Fixed and Trainable Fusion Classifiers: A Theoretical Study with Application to Biometric Authentication Tasks", Multiple Classifier Systems, MCS 2005, Lecture Notes in Computer Science, vol. 3541, pp. 1-11.

Taylor, Adrian et al., "Anomaly Detection in Automobile Control Network Data with Long Short-Term Memory Networks", IEEE 2016.

Taylor, Adrian "Anomaly-Based Detection of Malicious Activity in In-Vehicle Networks", Ph.D. Thesis, University of Ottawa 2017.

Wang, Alex Hai, "Don't Follow Me Spam Detection in Twitter", International Conference on Security and Cryptography, 2010, pp. 1-10.

Wang, Shuhao et al., "Session-Based Fraud Detection in Online E-Commerce Transactions Using Recurrent Neural Networks", 2017.

Zhang, Ke et al., "Automated IT System Failue Prediction: A Deep Learning Approach", IEEE 2016.

\* cited by examiner

⊘ Vendor   ⊘ Event type   ⊘ Conditions   ④ Fields   ⑤ Information   ⑥ Review   ⑦ Confirm Choose Fields
Fields are the fields of value in the log. Please provide values
for all required fields before moving to the next step.

Original Logs                           Select

| logon log sample user:barry dest 2-05-27 |
|---|

NEED HELP?  *505*  *510*  *520*  *530*  *540*

| # | Status | Field | Key | Value | Pattern (JRegex) | |
|---|---|---|---|---|---|---|
| 1 | ☆ | dest_ip* | dest_ip: | 1.1.1.1 | dest_ip:({dest_ip}[^\s]+) | ••• |
| 2 | ☆ | host* | host: | computer1 | host:({host}[^\s]+) | ••• |
| 3 | ☆ | time* | time: | 2012-05-27 | time:({time}[^\s]+) | ••• |
| 4 | ☆ | user* | user: | barry | user:({user}[^\s]+) | ••• |

FIG. 5A

SYSTEM, METHOD, AND COMPUTER PROGRAM FOR AUTOMATIC PARSER CREATION

RELATED APPLICATIONS

This application claims the benefit of U.S. Provisional Application No. 62/856,903 filed on Jun. 4, 2019, and titled "System, Method, and Computer Program for Automatically Creating a Parser for Raw Event Logs," the contents of which are incorporated by reference herein as if fully disclosed herein.

BACKGROUND OF THE INVENTION

1. Field of the Invention

This invention relates generally to computer parsers, and, more specifically, to automatically creating a parser for a group of raw event logs.

2. Description of the Background Art

Enterprise IT products generate a large variety and volume of event logs with data related to user activities in a network. For example, Microsoft's Active Directory (AD) records user-to-machine authentication events in AD domain controllers on a Windows environment; firewall security products generate alerts for user activities crossing the network perimeter; and endpoint products track file actions such as file deletion and creation, etc.

Various systems may use the event logs to manage an IT network. For instance, event logs are used by cybersecurity systems to detect potential cyberthreats to an IT network. A user-and-entity behavior analytics system (UEBA) uses event logs to create models of an entity's behavior in an IT network and determine when an enmity's behavior deviates from the norm. An example of a UEBA cybersecurity monitoring system is described in U.S. Pat. No. 9,798,883 issued on Oct. 24, 2017 and titled "System, Method, and Computer Program for Detecting and Assessing Security Risks in a Network," the contents of which are incorporated by reference herein.

Log formats can vary significantly across different IT vendors. For example, the following tokens may all relate to a user ID:

"User_id=Luke"
"Account=Kylo"
"Login_id=Finn"
"UserName=Rey"
"Account Login=Han"

The log data must be normalized before it can be used by a cybersecurity system or other system that uses log data from multiple sources. As a result, systems that use a variety of event logs rely on parsers that extract values or key/value pairs from raw event logs and normalize the data (i.e., for each log, the parser generates a message with normalized fields and format for the log data). For example, parsers could normalize the above example tokens as follows:

"user=Luke"
"userKylo"
"user=Finn"
"user=Rey"
"user=Han"

Parsers are created manually, and this is a time-consuming process. Companies that process raw event logs from numerous sources often employ large teams that are dedicated to creating parsers. Therefore, there is a demand for a more automated method for creating parsers that normalize log data.

SUMMARY OF THE DISCLOSURE

The present disclosure describes a system, method, and computer program for identifying log groups in need of a parser and for automatically creating a parser for a log group. A parser-creation system loads a plurality of logs and analyzes each log to determine whether the log matches conditions for an existing parser. If the log matches the conditions for an existing parser, the system associates the log with the applicable parser.

The system tokenizes logs that do not satisfy conditions for an existing parser, and groups logs based on token patterns. The system displays the log groups in a user interface and enables a user to select a log group for parser creation. The system also enables a user to associate a vendor and event type with the log group.

In response to the system receiving a user selection of a log group and the associated vendor and event type, the system begins the automated parser creation process. The system creates conditions for the parser based on literals common to each log in the group. This will enable the system to identify future logs that should be associated with this parser.

The system obtains the tokens (i.e., values and key/value pairs) from the log group and identifies a plurality of normalized fields that correspond to tokens in the log group. The system then maps each of the identified normalized field to a regular expression and an example token from the log group. The system also identifies any required fields for the parser based on the event type.

The system provides a user interface that enables the user to view the mapping of identified normalized fields to regular expressions and example tokens. The system also displays an indication of which of the identified normalized fields in the mapping are required for the parser. Moreover, if there are any required fields for the parser that are not included in the mapping, these required fields are also displayed in the user interface.

The system enables a user to modify and add to the mapping of identified normalized fields to regular expressions and example tokens. In response to a user confirming the mapping, the system creates a parser for the log group based on the mappings. The system associates the parser with a vendor and event type, as well as the conditions created for the parser.

In certain embodiments, the system identifies the normalized fields for the parser by comparing the tokens to a number of knowledgebases. The system compares each of the tokens to a first knowledgebase of regular expressions associated with normalized fields based on existing parsers accessible to the system. In response to a token satisfying one of the regular expressions in the first knowledgebase, the system determines that the token corresponds to the normalized field associated with the satisfied regular expression.

For each token that does not satisfy one of the known regular expressions in the first knowledgebase, the system ascertains whether the token includes (1) a key in a second knowledgebase of key names known to be associated with normalized fields used by the system, or (2) a value that satisfy a regular expression for a value type in a third knowledgebase of regular expressions for value types known to be associated with normalized fields used by the system. In response to the token including a key or a value type associated with a normalized field used by the system, the system concludes that the token corresponds to said normalized field.

In certain embodiments, if a token corresponds to a regular expression in one of the knowledgebases, then the normalized fields associated with the token is mapped to the regular expression satisfied by the token. Otherwise, the system autogenerates a regular expression for the token and maps the normalized field associated with the token with the generated regular expression. In addition, the system increases it knowledge by adding new normalized field-to-regular expression mappings to the first knowledgebase.

BRIEF DESCRIPTION OF THE DRAWINGS

FIG. 5A is a screenshot that illustrates an example user interface, according to one embodiment, that displays a mapping of normalized fields to regular expressions and example tokens.

DETAILED DESCRIPTION OF THE PREFERRED EMBODIMENTS

The present disclosure describes a system, method, and computer program for identifying log groups in need of a parser and for automatically creating a parser for a log group. Specifically, the disclosure relates to a system that groups logs that do not satisfy conditions for an existing parser, enables a user to select a log group for parser creation, and automatically creates a parser for the selected log group. In creating a parser, the system extracts values and key/value pairs from the log group and identifies the corresponding normalized output fields and regular expressions for the values and key-value pairs. The method is performed by a computer system, referred to herein as "the system" or the "parser-creation system." In one embodiment, the parsers created by the system are used by a cybersecurity system to parse logs and normalize the information in logs generated by various systems within an IT network.

Figure 1A:
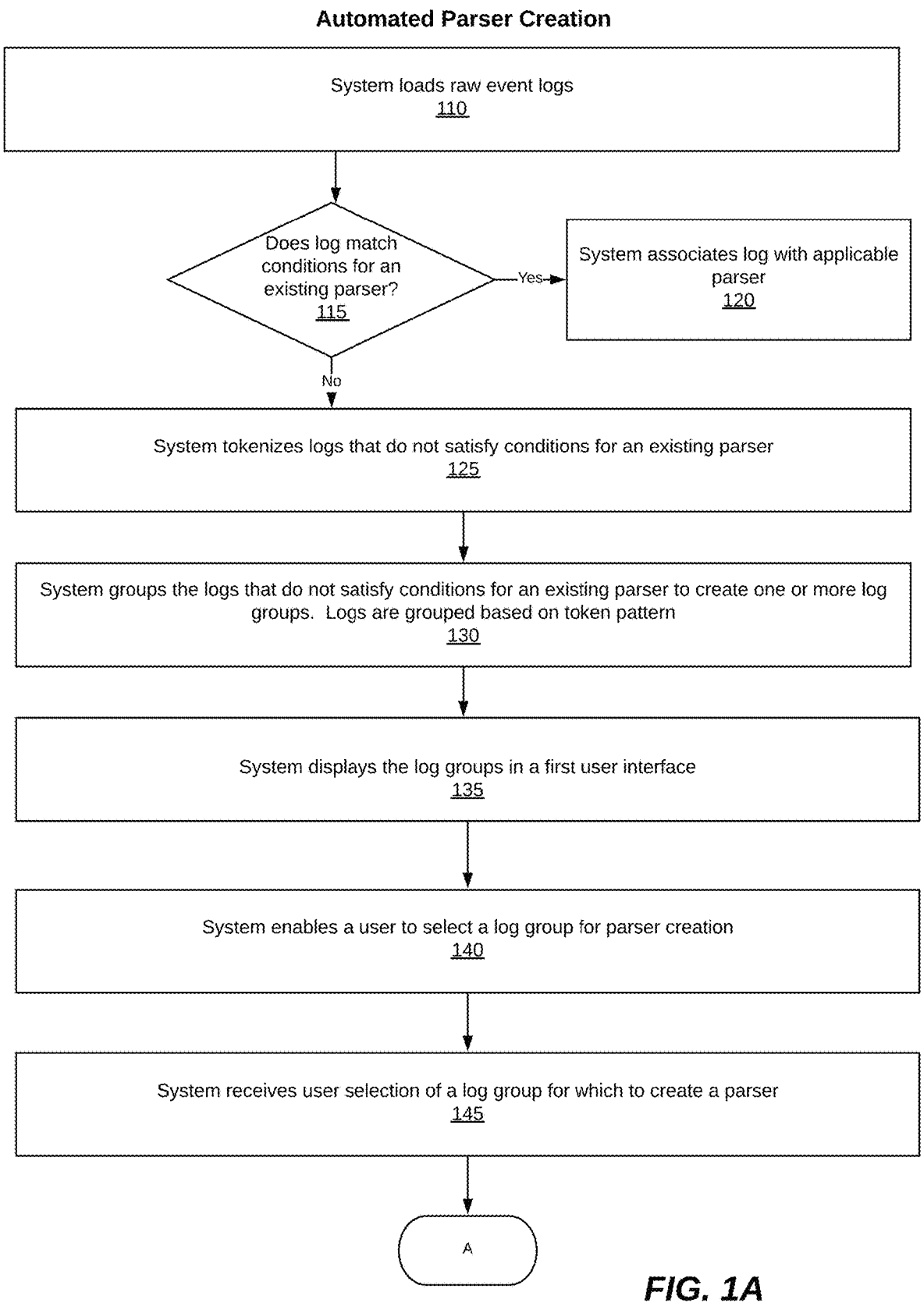
FIGS. 1A-1C are flowcharts that illustrate a method, according to one embodiment, for identifying log groups in need of a parser and for automatically creating a parser for a selected log group.
Figure 1B:
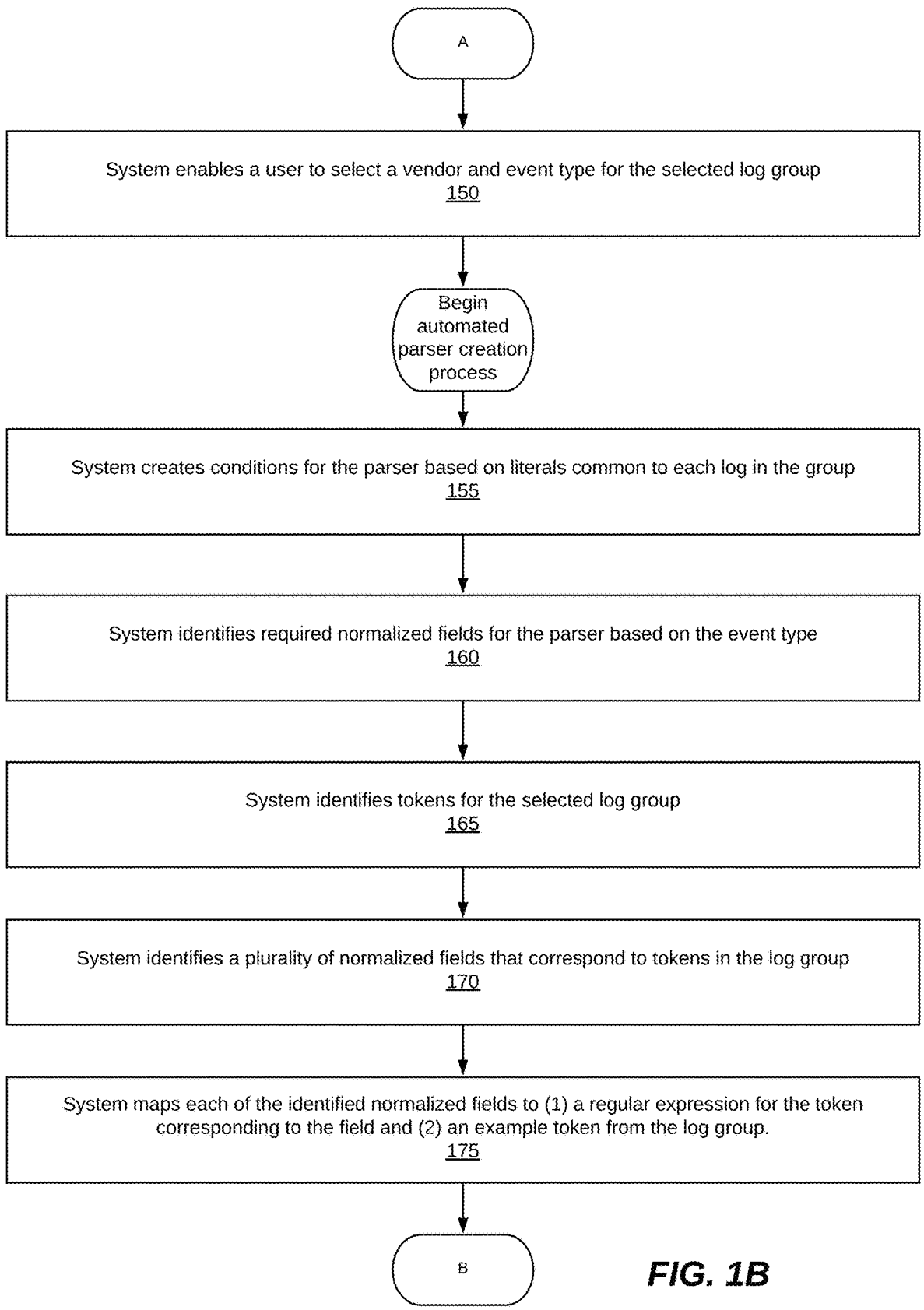
Figure 1C:
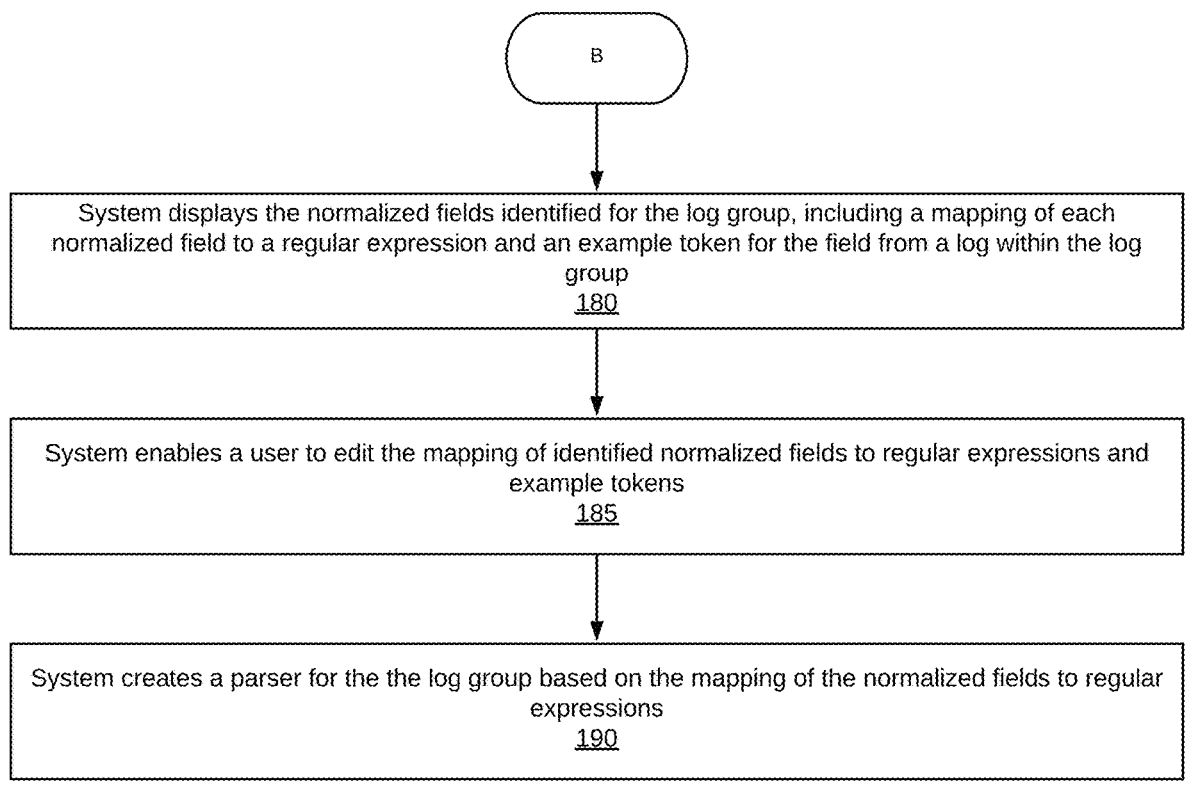

A method for identifying log groups in need of a parser and for automatically creating a parser for a selected log group is described below with respect to FIG. 1.

1. Grouping Logs and Enabling a User to Select a Log Group for Parser Creation Referring to FIGS. 1A-1C, the parser-creation system loads a plurality of logs and analyzes each log to determine whether the log matches conditions for an existing parser (steps 110, 115). The conditions for a parser are literals (i.e., tokens and/or text) that must exist in a log. If the log matches the conditions for an existing parser, the system associates the log with the applicable parser (120).

The system then proceeds to group logs that do not satisfy the conditions of an existing parser. To do so, the system first tokenizes the logs (step 125). Tokens are key-value pairs or values in the logs, and tokenizing a log means identifying the key-value pairs and/or values in the log. In one embodiment, tokenizing a log comprises ascertaining whether the log has a known log format. If so, the system removes any header and tokenizes the log in accordance with the known log format. If not, the system tokenizes the log by identifying the delimiters and the key-value pairs format.

The system then groups the logs based on token patterns (step 130). In one embodiment, logs whose tokens overlap by 50% or more are grouped together. The result of the grouping is that logs from the same vendor and for the same event type are in the same group.

The system displays the log groups in a user interface and enables the user to select a log group for parser-creation (steps 135, 140). In response to receiving a user selection of a log group, the system also enables the user to select a vendor and event type for the log group (steps 145, 150). For example, the system may first display a list of vendors known to provide IT-related logs, and, in response to a user selecting a vendor, the system displays the type of events for which the vendor is known to generate logs and enables the user to choose one of the event types.

2. Creating Conditions for a Parser for a Selected Log Group

In response to the system receiving a user selection of a log group and the associated vendor and event type, the system begins the automated parser creation process. The system creates conditions for the parser based on literals common to each log in the group (step 155). This will enable the system to identify future logs that should be associated with this parser.

3. Identifying Required Normalized Fields for the Parser

For logs meeting the conditions for the parser, the parser must be able to parse the logs for any output fields required for the associated event by the cybersecurity or other system that will be using the log data. Consequently, the parser-creation system identifies any required normalized fields for the parser based on the event type associated with the parser (step 160). Normalized fields are the keys in the output messages that will be generated by the parser being created. In other words, they are the output fields in the messages generated by the parser.

In one embodiment, the system identifies the required fields by creating a superset of normalized fields extracted in all pre-existing parsers accessible to the system for the same event type and then identifying the normalized fields in the superset that are common to all the preexisting parsers for the same event type. In an alternate embodiment, each event type is associated with a list of required normalized fields for the event type.

4. Identifying the Normalized Fields that Correspond to Tokens in the Log Group

The system identifies the tokens in the log group (step 165). As discussed above, each log in the group was previously tokenized, and identifying the tokens for the log group comprises aggregating the tokens of the individual logs in the log group.

Figure 2A:
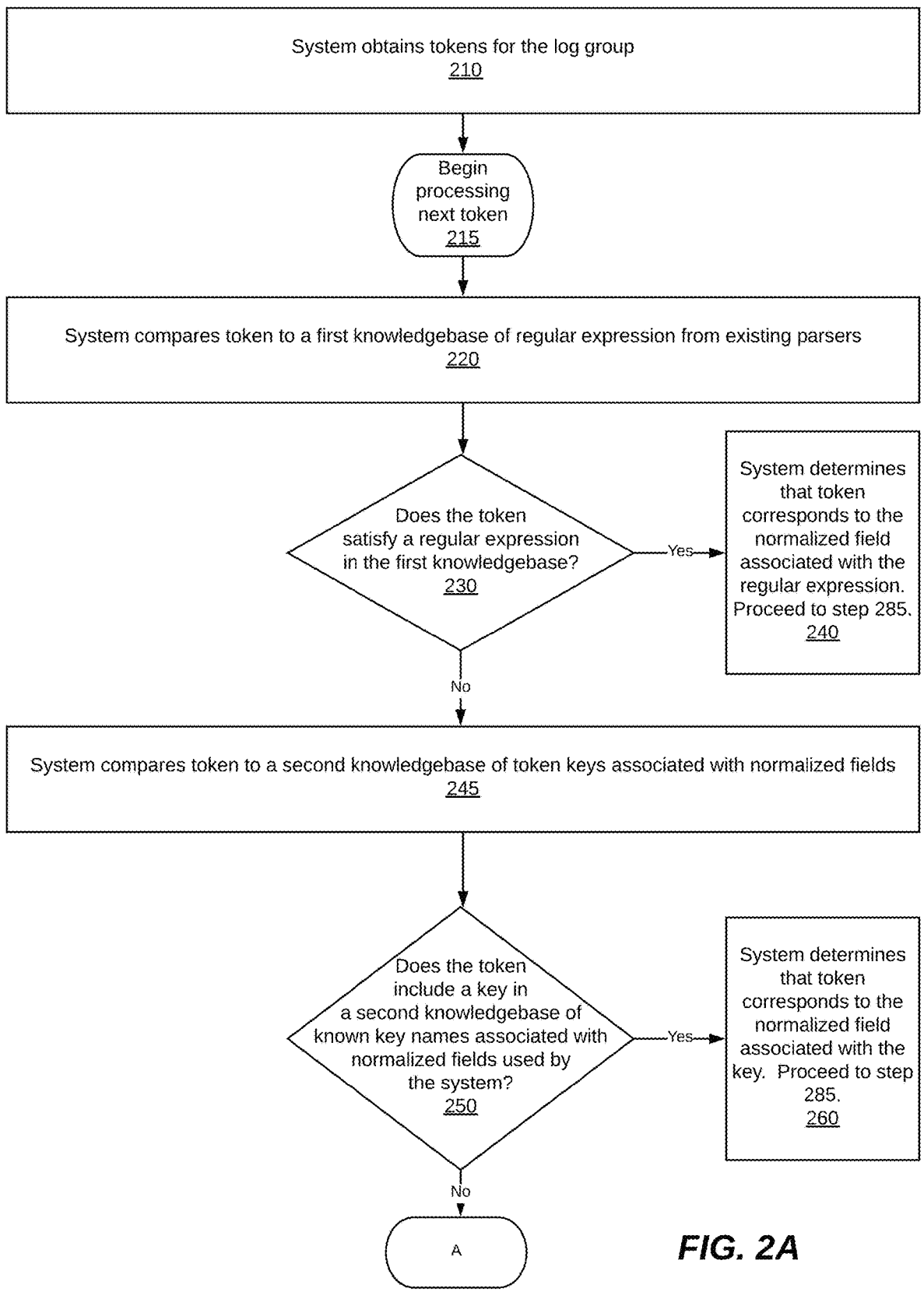
FIGS. 2A-2B are flowcharts that illustrate a method, according to one embodiment, for identifying the normalized fields that correspond to tokens in a log group.
Figure 2B:
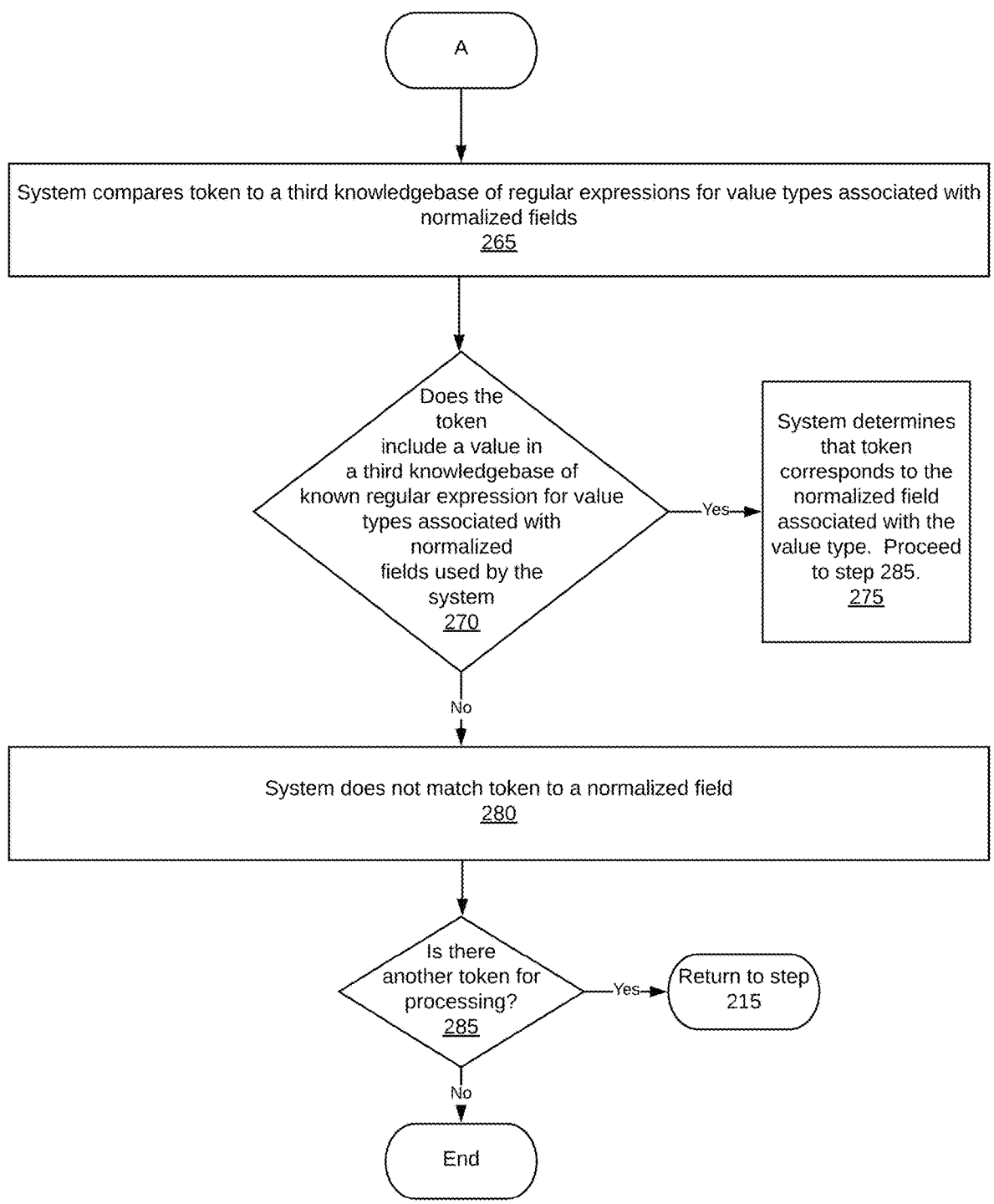

The system then identifies a plurality of normalized fields that correspond to tokens in the log group (step 170). The identified normalized fields may include both required fields and optional fields for the event type. Identifying the normalized fields that correspond to the tokens comprises comparing the tokens to: (1) regular expressions in existing parsers accessible to the system, (2) regular expressions for value types associated with normalized fields in the system, and (3) a list of keys in key-value pairs associated with normalized fields in the system. FIGS. 2A-2B illustrate a more detailed example of this process. As shown in the figure, the system selects a token from the log group and compares the token to a first knowledgebase of regular expressions from existing parsers accessible to the system (step 220). The first knowledgebase comprises a mapping of regular expressions for tokens to normalized fields. The first knowledgebase is automatically derived by the system by extracting mappings of regular expression to normalized fields from existing parsers. In other words, the first knowledgebase reflects the system's knowledge based on previous parsers created by the system or otherwise loaded into the system. The first knowledgebase may be seeded initially with a set of "starter parsers" that are loaded into the system. As described below, the first knowledgebase grows as the system creates new parsers and learns new token-to-normalized field correlations.

The system determines whether the token satisfies a regular expression in the first knowledgebase (i.e., a regular expression used in an existing parser) (step 230). In response to the token satisfying a regular expression in the first knowledgebase, the system determines that the token corresponds to the normalized field to which the satisfied regular expression is mapped in the first knowledgebase (step 240).

If the token does not satisfy a regular expression in the first knowledgebase, the system determines whether the token includes a key known to be associated with a normalized field. Specifically, the system compares the token to a second knowledgebase of token keys mapped to normalized fields (step 245). In certain embodiments, the second knowledgebase is based on industry/expert knowledge of keys known to correspond to normalized fields. In response to determining that a key in the token matches a key in the second knowledgebase, the system concludes that the token corresponds to the normalized field associated with the matching key in the second knowledgebase (steps 250, 260).

If the token neither satisfies a regular expression in the first knowledgebase, nor matches a key in the second knowledgebase, the system determines whether the token satisfies a regular expression for a value type associated with normalized fields in the system. Specifically, the system compares the token to a third knowledgebase of regular expressions for value types associated with normalized fields (step 265). In certain embodiments, the third knowledgebase is based on industry/expert knowledge of value types known to correspond to normalized fields. In response to determining that the token satisfies a regular expression in the third knowledgebase for a value type, the system concludes that the token corresponds to the normalized field associated with the value type (steps 270, 275).

If the token neither satisfies a regular expression in the first or third knowledgebases, nor includes a key in the second knowledgebase, the system does not match the token to a normalized field at this time (step 280). The method repeats until all the tokens in the log group have been processed (steps 285, 215). If a normalized field is identified from a token, then the system may map the identified normalized field to a regular expression, as discussed below, before proceeding to process the next token in step 215.

In certain embodiments, the first, second, and third knowledgebases are a suite of libraries. They may be separate libraries or subsections of the same library.

5. Mapping the Identified Normalized Fields to Regular Expressions and Example Tokens The system maps each of the identified normalized fields to a regular expression (step 175). More specifically, each normalized field identified in step 160 is mapped to a regular expression for the token corresponding to the field. The system also maps each of the identified normalized fields to an example token (from the log group) corresponding to the normalized field. The example token may be selected in a number of ways. For example, the system may randomly select the token from a group of tokens corresponding to the normalized field, or it may select the first token on a list of tokens (from the log group) corresponding to the normalized field.

Figure 3A:
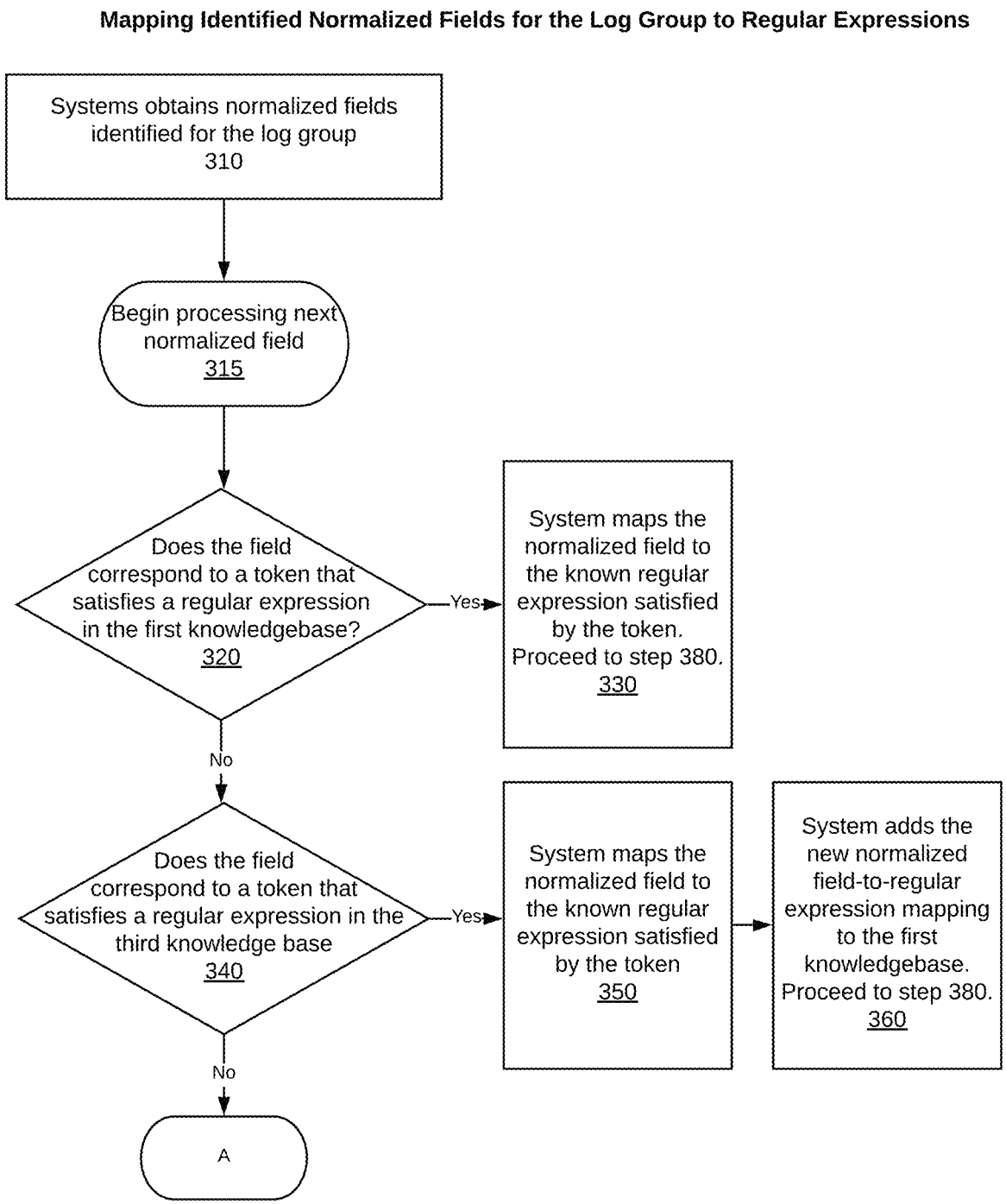
FIGS. 3A-3B are flowcharts that illustrate a method, according to one embodiment, for mapping an identified normalized field to a regular expression.
Figure 3B:
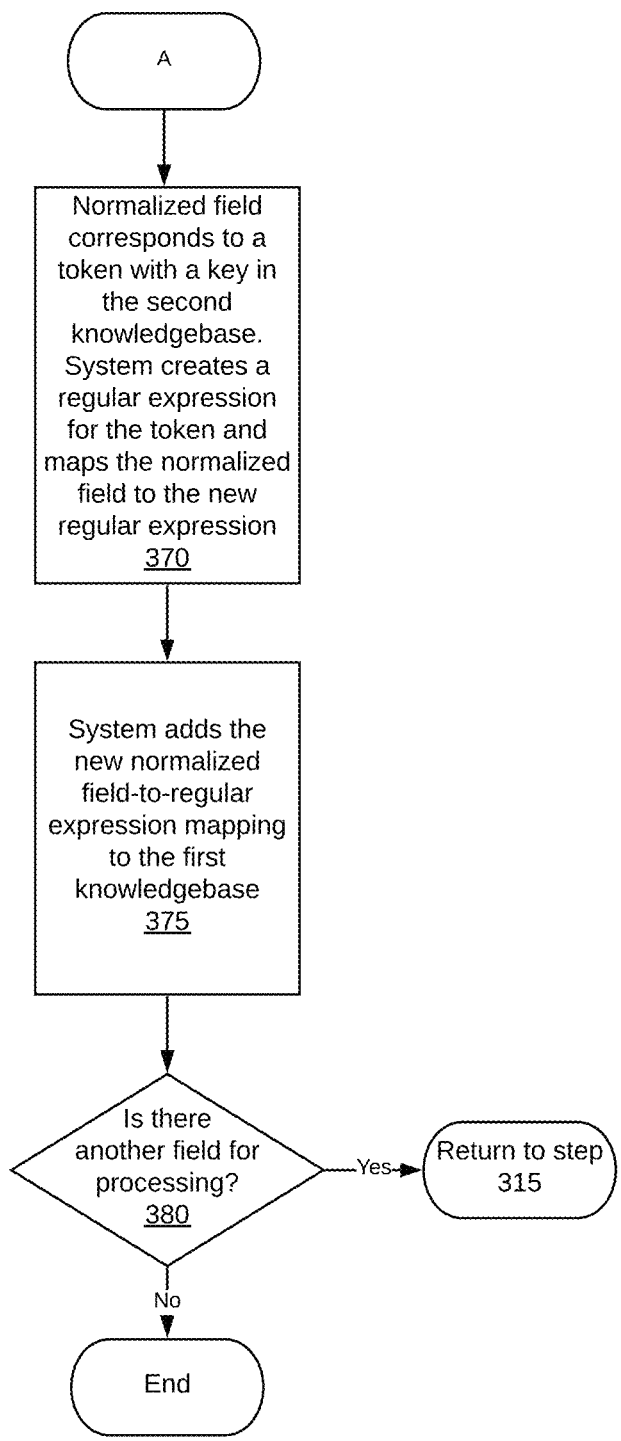

FIGS. 3A-3B illustrate a method for mapping an identified normalized field to a regular expression. If the normalized field corresponds to a token that satisfies a regular expression in the first knowledgebase, then, for purposes of the mapping of step 165, the normalized field is mapped to the regular expression satisfied by the token (steps 320, 330). If the normalized field corresponds to a token that matches a key in the second database, the system creates a regular expression for the token and maps the normalized field to the new regular expression (steps 340, 350). The system also add the new normalized field-to-regular expression mapping to the first knowledgebase (step 360). If the normalized field corresponds to a token that satisfies a regular expression for a value type in the third knowledgebase, then the normalized field is mapped to the regular expression satisfied by the token (step 370). This new mapping is added to the first knowledgebase (step 375). As shown with steps 360 and 375, the system learns over time and increases it knowledge of how tokens correspond to normalized fields. The method is repeated for each normalized field identified for the log group (steps 360, 315).

6. Enabling User to Edit Normalized Fields and Regular Expressions Identified for the Log Group The system provides a user interface that enables the user to view the mapping of identified normalized fields to regular expressions and example tokens (step 180). The system also displays an indication of which of the identified normalized fields are required for the parser. For example, required fields may be denoted with a symbol or other graphic feature. Moreover, if there are any required fields for the parser that are not included in the mapping, these required fields are also displayed in the user interface.

Figure 5B:
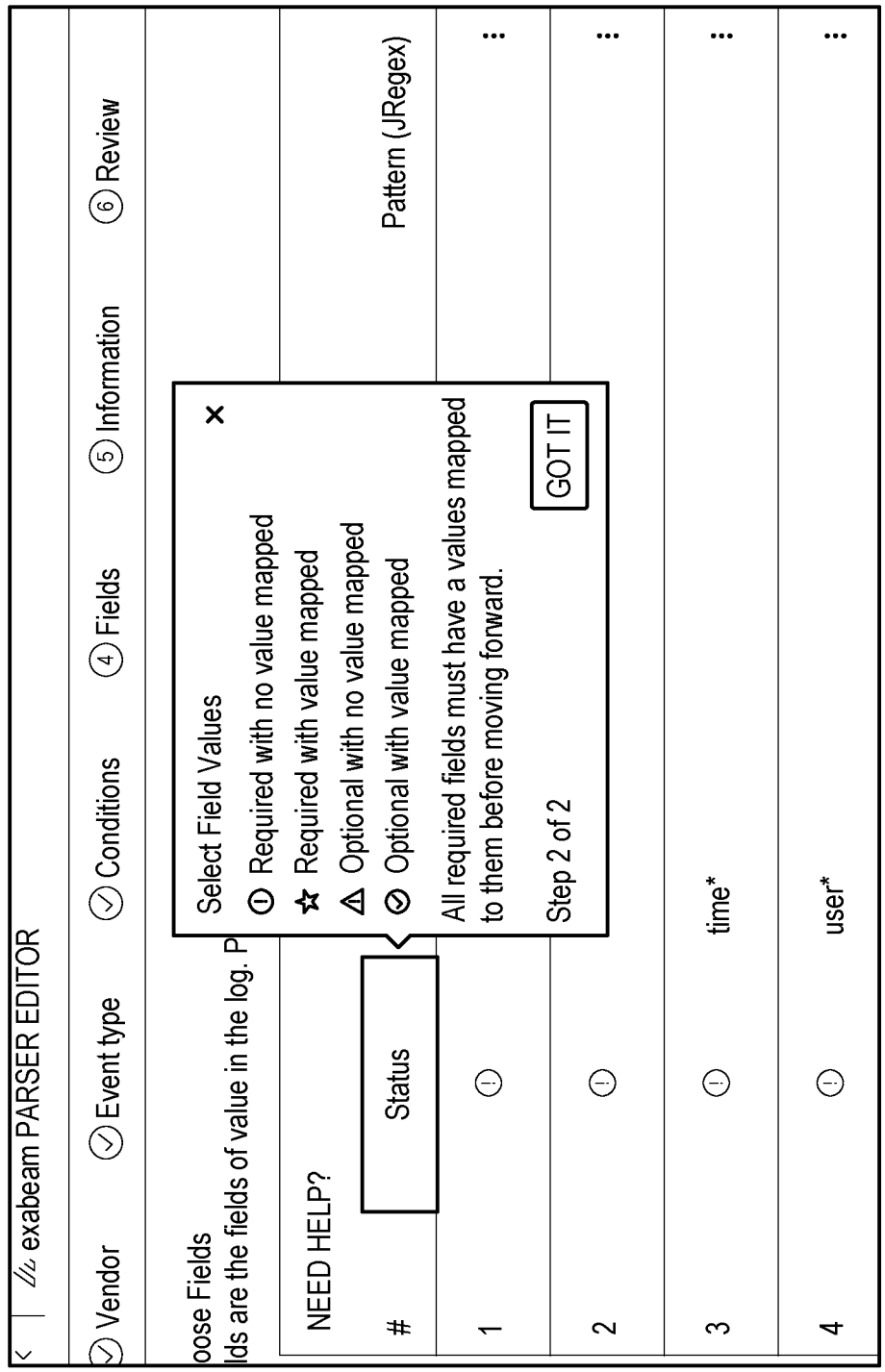
FIG. 5B is a screenshot that illustrates definitions for the symbols in the status field in FIG. 5A.

FIG. 5A illustrates an example of the user interface generated in step 180. The field column 510 lists the normalized fields identified or required for the parser. The key and value columns 520, 530 list example key-value tokens corresponding to the normalized fields in column 510. For fields with value-only tokens, then the key column 520 is blank. The pattern column 540 lists the regular expressions mapped to the normalized fields in column 510. The status column 505 lists the status associated with each of the normalized fields displayed in the user interface. FIG. 5B illustrate a window that appears when a user hovers over a status symbol. The window illustrates the meaning of each symbol (e.g., whether the corresponding normalized field is required or optional and whether an example token and regular expression was mapped to the field).

In certain embodiments, the system also provides a user interface in which a user can view a list of all the tokens for the log group and the normalized fields matched to each token. Such views allow a user to confirm that matchings are correct, as well as to see any tokens from the log group not matched to a normalized field. The system may also enable a user to review and edit conditions for the log group.

Figure 6:
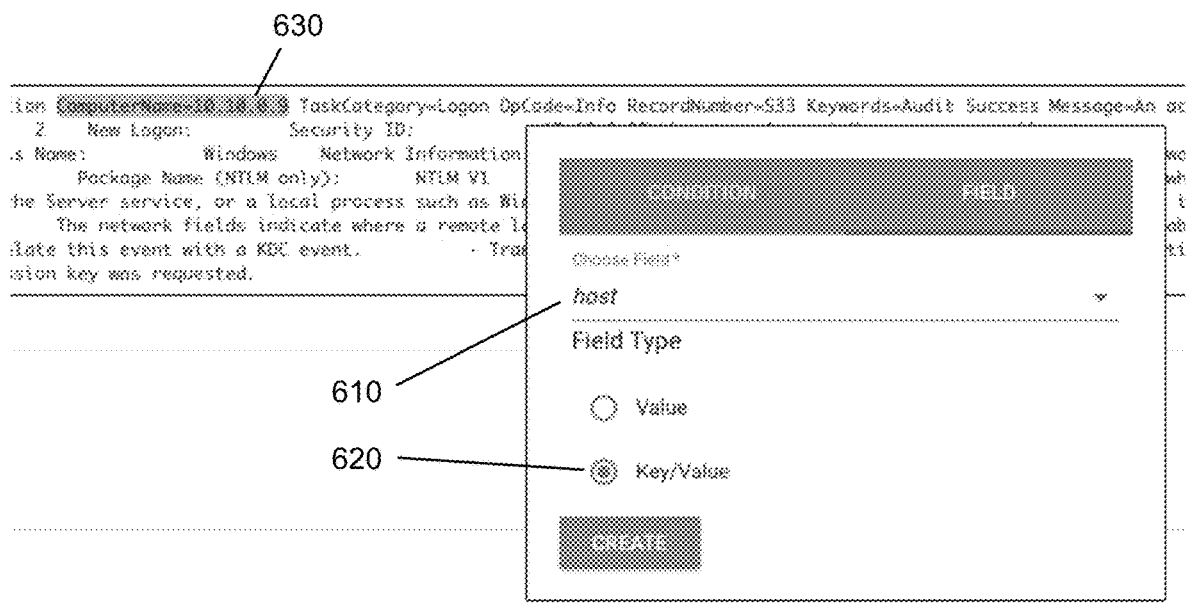
FIG. 6 is a screenshot that illustrates an example user interface, according to one embodiment, for enabling a user to add to the mapping of normalized fields to regular expressions and example tokens.

The system enables the user to edit the mapping of identified normalized fields to regular expressions and example tokens (step 185). This includes being able to modify the mappings for identified normalized fields, being able to add regular expressions and example tokens for unmatched required fields, and being able to add normalized fields and regular expressions to unmatched tokens. FIG. 6 illustrates an example of a way a user can add to the mapping. In this embodiment, the user can view one or more logs from the log group and highlight any token with the log group. As shown in FIG. 6, the user can assign a normalized a field and a field type (e.g., value or key/value) to a highlighted token. For example, in FIG. 6, the user has assigned the highlighted token "Computer Name=10.10.0.9" (630) to the field "host" (610) and the field type "key/value" (620). When the user selects the "create" button, the system auto-generates a regular expression for the highlighted token and adds the assigned normalized field and regular expression to the mapping. The highlighted token is used as the example token for the normalized field. This regular expression-to-normalized field match is also added to the first knowledgebase base, thereby enabling the system to learn from the user's edits.

7. Creating a Parser

The user interface includes a call-to-action that enables a user to indicate that the displayed normalized fields and corresponding regular expressions are acceptable and to initiate the final parser creation step. For example, the user interface may include a "create parser" button or the like. In response to a user selecting the call-to-action, the system creates a parser for the log group based on the mapping of the normalized fields to regular expressions (as modified by the user if applicable) (step 190). The system associates the created parser with the vendor and event type selected for the log group. Also, the system associates the parser with the conditions for the log group.

8. Example Software Architecture

Figure 4:
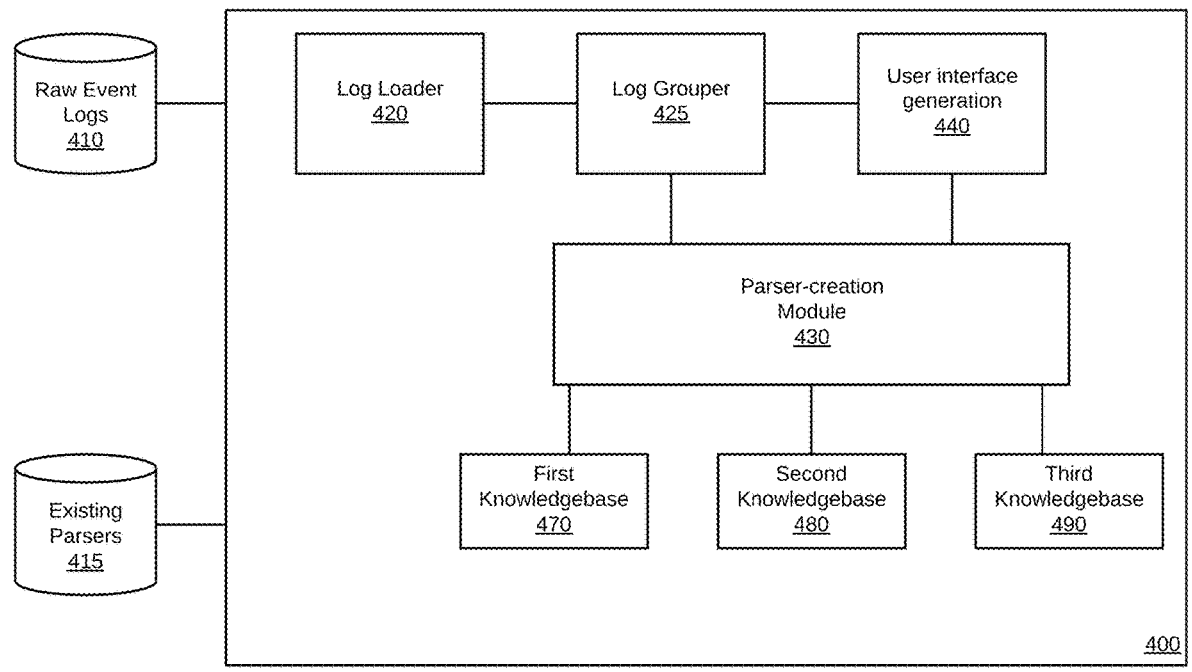
FIG. 4 is a block diagram that illustrates an example software architecture for a parser-creation system according to one embodiment.

FIG. 4 illustrates an example system architecture for performing the methods described herein. The methods described herein may be implemented in a system configured differently and are not limited to the system architecture illustrated in FIG. 4.

A log loader module 420 loads raw event logs 410 into the system 400. The log grouper module 420 groups logs as described above, and a parser-creation module 430 creates a parser for a selected group of raw logs in accordance with the methods of FIGS. 1-3. To identify the normalized fields corresponding to tokens in a log group, the parser-creation module accesses the first, second, and third knowledgebases 470, 480, and 490, which collectively include (1) regular expressions in existing parsers accessible to the system (470), (2) regular expressions for value types associated with normalized fields in the system (490), and (3) a list of keys in key-value pairs associated with normalized fields in the system (480). The user interface generation module 440 generates the user interfaces discussed above. Created parsers are added to parser database 415.

8. General

The methods described herein are embodied in software and performed by one or more computer systems (each comprising one or more computing devices) executing the software. A person skilled in the art would understand that a computer system has one or more memory units, disks, or other physical, computer-readable storage media for storing software instructions, as well as one or more processors for executing the software instructions. All illustrated screen shots and user interfaces are examples and not limiting of the invention.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for creating a parser for a log group that parses and normalizes log data, the method comprising:
    loading a plurality of logs into the system;
    for each log in the plurality of logs, determining whether the log satisfies conditions for an existing parser;
    in response to a log satisfying conditions for an existing parser, associating the log with said existing parser;
    tokenizing logs that do not satisfy conditions for an existing parser;
    grouping the logs that do not satisfy conditions for an existing parser to create one or more log groups, wherein the logs are grouped based on token patterns;
    displaying the log groups in a first user interface and enabling a user to select a log group for parser creation;
    receiving a user selection of a log group for parser creation;
    enabling the user to select a vendor and an event type for the selected log group;
    receiving the user selection of a vendor and event type for the selected log group;
    creating a parser for the selected log group, wherein creating the parser comprises:
        creating conditions for the parser based on literals common to each log in the log group;
        identifying any required normalized fields for the parser based on the event type;
        identifying tokens for the selected log group;
        identifying a plurality of normalized fields that correspond to the tokens in the selected log group, wherein identifying a plurality of normalized fields comprises:
            comparing each of the tokens to a first knowledgebase of regular expressions associated with normalized fields based on existing parsers accessible to the system,
            in response to a token satisfying one of the regular expressions in the first knowledgebase, determining that the token corresponds to the normalized field associated with the satisfied regular expression,
            in response to the token not satisfying one of the regular expressions in the first knowledgebase, determining whether the token includes a key in a second knowledgebase of known key names associated with normalized fields used by the system, and, wherein for at least one token that does not satisfy one of the regular expressions in the first knowledgebase, determining whether the token includes a value that satisfies a regular expression for a value type in a third knowledgebase of regular expressions for value types associated with normalized fields used by the system, wherein the first knowledgebase, second knowledgebase, and third knowledgebase are separate libraries, and in response to the token including a key or a value type associated with a normalized field used by the system, determining that the token corresponds to said normalized field;

mapping each of the identified normalized fields to a regular expression and an example token from the log group;

providing a second user interface that enables a user to view the mapping of identified normalized fields to regular expressions and example tokens, wherein the user interface includes an indication of which of the identified normalized fields are required fields for the parser and wherein the user interface also displays any required normalized field not mapped to a regular expression and an example token;

enabling a user to modify and add to the mapping of identified normalized fields to regular expressions and example tokens; and creating a parser for the log group based on the mapping, wherein the parser is associated with the vendor and event type selected by the user, as well as the conditions for the log group.

2. The method of claim 1, wherein mapping an identified normalized field to a regular expression comprises the following:

in response to the identified normalized field corresponding to a token that satisfies one of the regular expressions in the first knowledgebase, mapping the identified normalized field to the regular expression satisfied by the token;

in response to the identified normalized field corresponding to a token that satisfies one of the regular expressions in the third knowledgebase, mapping the identified normalized field to the regular expression satisfied by the token and adding the mapping of the identified normalized field to said regular expression to the first knowledgebase;

in response to the identified normalized field corresponding to a token that is not satisfied by a regular expression in the first or third knowledgebase, but includes a key associated with a normalized field used by the system, creating a regular expression for the corresponding token, mapping the identified normalized field to the created regular expression, and adding the mapping of the identified normalized field to the created regular expression to the first knowledge base of known regular expressions.

3. The method of claim 1, wherein identifying required normalized fields for the parser comprises the following:

identifying pre-existing parsers accessible to the system for the same event type as the event type selected by the user for the log group;

obtaining a superset of normalized fields extracted in all the pre-existing parsers for the same event type; and identifying the normalized fields within the superset that are common to all the preexisting parsers for the same event type as the required normalized fields for the parser.

4. A non-transitory computer-readable medium comprising a computer program that, when executed by a computer system, enables the computer system to perform the following method for creating a parser for a log group that parses and normalizes log data, the method comprising:

loading a plurality of logs into the system;

for each log in the plurality of logs, determining whether the log satisfies conditions for an existing parser;

in response to a log satisfying conditions for an existing parser, associating the log with said existing parser;

tokenizing logs that do not satisfy conditions for an existing parser;

grouping the logs that do not satisfy conditions for an existing parser to create one or more log groups, wherein the logs are grouped based on token patterns;

displaying the log groups in a first user interface and enabling a user to select a log group for parser creation;

receiving a user selection of a log group for parser creation;

enabling the user to select a vendor and an event type for the selected log group;

receiving the user selection of a vendor and event type for the selected log group;

creating a parser for the selected log group, wherein creating the parser comprises:

creating conditions for the parser based on literals common to each log in the log group;

identifying any required normalized fields for the parser based on the event type;

identifying tokens for the selected log group;

identifying a plurality of normalized fields that correspond to the tokens in the selected log group, wherein identifying a plurality of normalized fields comprises:

comparing each of the tokens to a first knowledgebase of regular expressions associated with normalized fields based on existing parsers accessible to the system, in response to a token satisfying one of the regular expressions in the first knowledgebase, determining that the token corresponds to the normalized field associated with the satisfied regular expression, in response to the token not satisfying one of the regular expressions in the first knowledgebase, determining whether the token includes a key in a second knowledgebase of known key names associated with normalized fields used by the system, and, wherein for at least one token that does not satisfy one of the regular expressions in the first knowledgebase, determining whether the token includes a value that satisfies a regular expression for a value type in a third knowledgebase of regular expressions for value types associated with normalized fields used by the system, wherein the first knowledgebase, second knowledgebase, and third knowledgebase are separate libraries, and in response to the token including a key or a value type associated with a normalized field used by the system, determining that the token corresponds to said normalized field;

mapping each of the identified normalized fields to a regular expression and an example token from the log group;

providing a second user interface that enables a user to view the mapping of identified normalized fields to regular expressions and example tokens, wherein the user interface includes an indication of which of the identified normalized fields are required fields for the parser and wherein the user interface also displays any required normalized field not mapped to a regular expression and an example token;

enabling a user to modify and add to the mapping of identified normalized fields to regular expressions and example tokens; and creating a parser for the log group based on the mapping, wherein the parser is associated with the vendor and event type selected by the user, as well as the conditions for the log group.

5. The non-transitory computer-readable medium of claim 4, wherein mapping an identified normalized field to a regular expression comprises the following:

in response to the identified normalized field corresponding to a token that satisfies one of the regular expressions in the first knowledgebase, mapping the identified normalized field to the regular expression satisfied by the token;

in response to the identified normalized field corresponding to a token that satisfies one of the regular expressions in the third knowledgebase, mapping the identified normalized field to the regular expression satisfied by the token and adding the mapping of the identified normalized field to said regular expression to the first knowledgebase;

in response to the identified normalized field corresponding to a token that is not satisfied by a regular expression in the first or third knowledgebase, but includes a key associated with a normalized field used by the system, creating a regular expression for the corresponding token, mapping the identified normalized field to the created regular expression, and adding the mapping of the identified normalized field to the created regular expression to the first knowledge base of known regular expressions.

6. The non-transitory computer-readable medium of claim 4, wherein identifying required normalized fields for the parser comprises the following:

identifying pre-existing parsers accessible to the system for the same event type as the event type selected by the user for the log group;

obtaining a superset of normalized fields extracted in all the pre-existing parsers for the same event type; and identifying the normalized fields within the superset that are common to all the preexisting parsers for the same event type as the required normalized fields for the parser.

7. A computer system for creating a parser for a log group that parses and normalizes log data, the system comprising:

one or more processors;

one or more physical memory units coupled to the one or more processors, wherein the one or more memory units store instructions that, when executed by the one or more processors, cause the system to perform the operations of:

loading a plurality of logs into the system;

for each log in the plurality of logs, determining whether the log satisfies conditions for an existing parser;

in response to a log satisfying conditions for an existing parser, associating the log with said existing parser;

tokenizing logs that do not satisfy conditions for an existing parser;

grouping the logs that do not satisfy conditions for an existing parser to create one or more log groups, wherein the logs are grouped based on token patterns;

displaying the log groups in a first user interface and enabling a user to select a log group for parser creation;

receiving a user selection of a log group for parser creation;

enabling the user to select a vendor and an event type for the selected log group;

receiving the user selection of a vendor and event type for the selected log group;

creating a parser for the selected log group, wherein creating the parser comprises:

creating conditions for the parser based on literals common to each log in the log group;

identifying any required normalized fields for the parser based on the event type;

identifying tokens for the selected log group;

identifying a plurality of normalized fields that correspond to the tokens in the selected log group, wherein identifying a plurality of normalized fields comprises:

comparing each of the tokens to a first knowledgebase of regular expressions associated with normalized fields based on existing parsers accessible to the system, in response to a token satisfying one of the regular expressions in the first knowledgebase, determining that the token corresponds to the normalized field associated with the satisfied regular expression, in response to the token not satisfying one of the regular expressions in the first knowledgebase, determining whether the token includes a key in a second knowledgebase of known key names associated with normalized fields used by the system, and, wherein for at least one token that does not satisfy one of the regular expressions in the first knowledgebase, determining whether the token includes a value that satisfies a regular expression for a value type in a third knowledgebase of regular expressions for value types associated with normalized fields used by the system, wherein the first knowledgebase, second knowledgebase, and third knowledgebase are separate libraries, and in response to the token including a key or a value type associated with a normalized field used by the system, determining that the token corresponds to said normalized field;

mapping each of the identified normalized fields to a regular expression and an example token from the log group;

identifying any required normalized fields for the parser based on the event type;

providing a second user interface that enables a user to view the mapping of identified normalized fields to regular expressions and example tokens, wherein the user interface includes an indication of which of the identified normalized fields are required fields for the parser and wherein the user interface also displays any required normalized field not mapped to a regular expression and an example token;

enabling a user to modify and add to the mapping of identified normalized fields to regular expressions and example tokens; and creating a parser for the log group based on the mapping, wherein the parser is associated with the vendor and event type selected by the user, as well as the conditions for the log group.

8. The system of claim 7, wherein mapping an identified normalized field to a regular expression comprises the following:
- in response to the identified normalized field corresponding to a token that satisfies one of the regular expressions in the first knowledgebase, mapping the identified normalized field to the regular expression satisfied by the token;
- in response to the identified normalized field corresponding to a token that satisfies one of the regular expressions in the third knowledgebase, mapping the identified normalized field to the regular expression satisfied by the token and adding the mapping of the identified normalized field to said regular expression to the first knowledgebase;
- in response to the identified normalized field corresponding to a token that is not satisfied by a regular expression in the first or third knowledgebase, but includes a key associated with a normalized field used by the system, creating a regular expression for the corresponding token, mapping the identified normalized field to the created regular expression, and adding the mapping of the identified normalized field to the created regular expression to the first knowledge base of known regular expressions.

9. The system of claim 7, wherein identifying required normalized fields for the parser comprises the following:
- identifying pre-existing parsers accessible to the system for the same event type as the event type selected by the user for the log group;
- obtaining a superset of normalized fields extracted in all the pre-existing parsers for the same event type; and
- identifying the normalized fields within the superset that are common to all the preexisting parsers for the same event type as the required normalized fields for the parser.

* * * * *